US012708235B2

(12) United States Patent
Jeong et al.

(10) Patent No.: US 12,708,235 B2
(45) Date of Patent: Aug. 18, 2026

(54) COOKING APPLIANCE WITH AREA TEMPERATURE CONTROL

(71) Applicant: SAMSUNG ELECTRONICS CO., LTD., Suwon-si (KR)

(72) Inventors: Jiho Jeong, Suwon-si (KR); Gyeongjin Kim, Suwon-si (KR); Taehun Kim, Suwon-si (KR); Kyumin Koh, Suwon-si (KR); Sanggyun Ye, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 919 days.

(21) Appl. No.: 17/993,477

(22) Filed: Nov. 23, 2022

(65) Prior Publication Data

US 2023/0086024 A1 Mar. 23, 2023

Related U.S. Application Data

(63) Continuation of application No. PCT/KR2021/006178, filed on May 18, 2021.

(30) Foreign Application Priority Data

May 26, 2020 (KR) ........................ 10-2020-0062722

(51) Int. Cl.
*A47J 37/06* (2006.01)
*A47J 27/12* (2006.01)
(Continued)

(52) U.S. Cl.
CPC ........... *A47J 37/0635* (2013.01); *A47J 27/12* (2013.01); *A47J 36/02* (2013.01); *H05B 6/6402* (2013.01); *H05B 6/6482* (2013.01)

(58) Field of Classification Search
None
See application file for complete search history.

(56) References Cited

U.S. PATENT DOCUMENTS 7,326,428 B2 2/2008 Weir
11,257,394 B2 2/2022 Cheng et al.
(Continued)

FOREIGN PATENT DOCUMENTS

EP 2 897 503 B1 5/2019
FR 2689214 A1 * 10/1993 .......... A47J 37/0635
(Continued)

OTHER PUBLICATIONS

FR 2689214 A1 (Jolly, Marcel) Oct. 1, 1993 [retrieved on Feb. 7, 2026]. Retrieved from Foreign Image and Text database, translation by Clarivate Analytics. (Year: 1993).*
(Continued)

*Primary Examiner* — John J Norton
(74) *Attorney, Agent, or Firm* — STAAS & HALSEY LLP

(57) ABSTRACT

A cooking appliance includes a cooking chamber, a shelf disposed in the cooking chamber and comprising a plurality of cooking areas, a plurality of heaters mounted at one portion of the cooking chamber, spaced apart from one another to correspond to the plurality of cooking areas, respectively, and independently controlled to generate heat, and a heat-reflecting plate comprising a plurality of reflectors respectively accommodating the corresponding plurality of heaters therein, and to reflect the heat generated by the plurality of heaters to the corresponding plurality of cooking areas to generate a temperature difference among the plurality of cooking areas.

18 Claims, 9 Drawing Sheets

(51) Int. Cl.
*A47J 36/02* (2006.01)
*H05B 6/64* (2006.01)

(56) References Cited

U.S. PATENT DOCUMENTS

2001/0032838 A1* 10/2001 Kim .......................... A23L 5/15
219/405
2008/0296292 A1* 12/2008 Byun ................... H05B 6/6482
219/680
2019/0021142 A1* 1/2019 Mizuta ................ A47J 37/0635
2019/0141798 A1* 5/2019 Cheng .................. H05B 6/6435

FOREIGN PATENT DOCUMENTS

JP 6-235527 A 8/1994
JP 2012-247075 A 12/2012
JP 5861029 B2 2/2016
JP 2018-201766 A 12/2018
KR 10-0141084 B1 6/1998
KR 19990039008 A * 6/1999 ........... H05B 6/6482
KR 10-0608950 B1 8/2006
KR 10-2008-0044055 A 5/2008
KR 10-2012-0112688 A 10/2012
KR 10-1425896 B1 8/2014
KR 10-2017-0135619 A 12/2017
WO WO-2007141304 A2 * 12/2007 ................ F24C 7/06
WO WO 2019/032906 A1 2/2019

OTHER PUBLICATIONS

International Search Report dated Aug. 20, 2021 in International Application No. PCT/KR2021/006178.
Written Opinion dated Aug. 20, 2021 in International Application No. PCT.KR2021/006178.
Office Action dated Jun. 26, 2024 issued in Korean Application No. 10-2020-0062722.

* cited by examiner

COOKING APPLIANCE WITH AREA TEMPERATURE CONTROL

CROSS-REFERENCE TO RELATED APPLICATIONS

This application is a continuation application, under 35 U.S.C. § 111(a), of International Patent Application No. PCT/KR2021/006178, filed on May 18, 2021, which claims the priority benefit of Korean Patent Application No. 10-2020-0062722, filed on May 26, 2020 in the Korean Patent and Trademark Office, the disclosure of which is hereby incorporated by reference in its entirety.

BACKGROUND

1. Field

The present disclosure relates to a cooking appliance, and more particularly, to a cooking appliance having an enhanced structure in which a space for cooking in a cooking chamber is partitioned.

2. Description of the Related Art

A cooking appliance is an apparatus used to cook an object to be cooked such as food by heating and may provide various functions related to cooking such as heating, defrosting, drying, and sterilization of the object to be cooked.

Examples of the cooking appliance may include an oven such as a gas oven or an electric oven, a microwave heating device (hereinafter, referred to as microwave oven), a gas stove, an electric range, a gas grill, and an electric grill.

In general, an oven is an apparatus configured to cook food by directly transferring heat to the food using a heat source generating heat such as a heater or by heating the inside of a cooking chamber, and a microwave oven is an apparatus configured to cook food using frictional heat generated between molecules by disturbing molecular arrangement of the food using high frequency radio waves as a heat source.

In the case where two or more different foods are cooked using a cooking appliance, optimal temperatures for the foods may be different. Because foods are cooked at the same temperature in the cooking appliance, there may be a problem in that some of the foods may not be cooked enough.

SUMMARY

In accordance with an aspect of the present disclosure, a cooking appliance includes a cooking chamber, a shelf disposed in the cooking chamber and including a plurality of cooking areas, a plurality of heaters mounted at one portion of the cooking chamber, spaced apart from one another to correspond to the plurality of cooking areas, respectively, and independently controlled to generate heat, and a heat-reflecting plate including a plurality of reflectors respectively accommodating the corresponding plurality of heaters therein, and to reflect the heat generated by the plurality of heaters to the corresponding plurality of cooking areas to generate a temperature difference among the plurality of cooking areas.

The plurality of reflectors may be formed by bending the heat-reflecting plate and have a curved surface with an open portion, to accommodate the corresponding plurality of reflectors therein, respectively.

The heat-reflecting plate may further include a plurality of connectors extending in a first direction to connect the plurality of reflectors adjacent to each other, and a length of each of the plurality of connectors is greater than a length of the open portion of each of the plurality of reflectors in the first direction.

A direction where the plurality of heaters are spaced apart may be the first direction, the plurality of heaters may extend in a second direction perpendicular to the first direction, and the plurality of reflectors may respectively reflect the heat generated by the plurality of heaters to the plurality of cooking areas through the open portion.

The plurality of reflectors may include: a first reflector and a second reflector symmetrically formed to be adjacent to a central region of the heat-reflecting plate, and a third reflector and a fourth reflector symmetrically formed at end regions of the heat-reflecting plate.

The heat-reflecting plate may further include a plurality of couplers respectively extending outward from the third reflector and the fourth reflector and formed at opposite ends of the heat-reflecting plate.

The cooking appliance may further include a heater housing disposed at one portion of the cooking chamber to accommodate to the plurality of heaters and the heat-reflecting plate, wherein the heat-reflecting plate is disposed between the plurality of heaters and the heater housing.

The plurality of heaters may be provided to penetrate the heater housing.

The heat-reflecting plate may further include a planar coupler coupled to the heater housing at the central region.

The cooking appliance may further include a heater cover disposed between the plurality of heaters and the cooking chamber and having a plurality of holes through which the heat generated by the plurality of heaters passes and the heat reflected by the plurality of reflectors.

The heater cover may include an aluminum material.

Each of the plurality of heaters may be have different internal resistances along the extending direction.

At least one of the plurality of reflectors may be bent in a U-shape around the plurality of heaters, and one side of the at least one of the bent reflectors is open to the cooking chamber.

The plurality of cooking areas may be partitioned along the first direction, and the plurality of reflectors may be spaced apart along the first direction to correspond to the plurality of cooking areas, respectively.

A distance between the plurality of reflectors in the first direction may be greater than a length of each of the plurality of reflectors in the first direction.

In accordance with an aspect of the present disclosure, a cooking appliance includes a cooking chamber, a shelf disposed in the cooking chamber and withdrawable therefrom and having a plurality of cooking areas, a plurality of heaters spaced apart along a first direction, and a heat-reflecting plate including a plurality of reflectors having an open curved surface to respectively accommodating the corresponding plurality of heaters therein, wherein the plurality of heaters are independently controlled and heat reflected by the plurality of reflectors is supplied to the corresponding plurality of cooking areas.

The heat-reflecting plate may further include a plurality of connectors extending in the first direction to connect the plurality of reflectors adjacent to each other, and a length of each of the plurality of connectors is greater than a length of the open curved surface of each of the plurality of reflectors in the first direction.

The plurality of reflector may include a first reflector and a second reflector symmetrically formed to be adjacent to a central region of the heat-reflecting plate, and a third reflector and a fourth reflector symmetrically formed at end regions of the heat-reflecting plate.

In accordance with an aspect of the present disclosure, a cooking appliance includes a cooking chamber, a shelf disposed in the cooking chamber and having a cooking area, at least one heater to supply heat to a cooking area of the shelf, and a cover member to cover an object to be cooked placed on the shelf, wherein the cover member partially transmits heat supplied to the cooking area.

The cover member is slidably movable with respect to the shelf.

DETAILED DESCRIPTION

Figure 1:
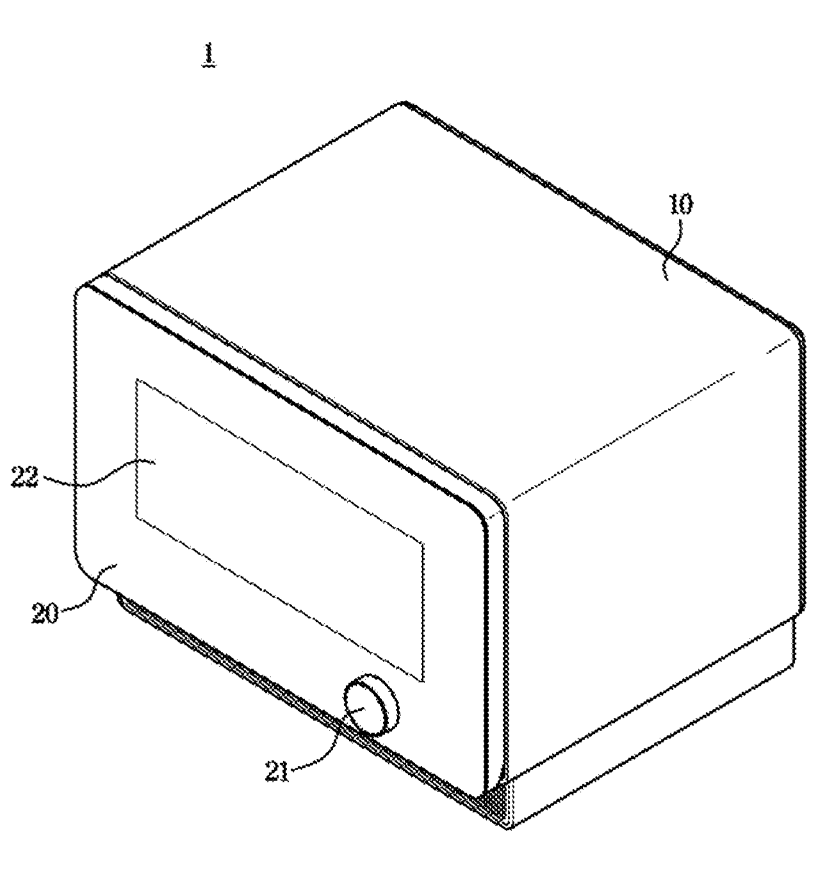
FIG. 1 is a perspective view of a cooking appliance according to an embodiment of the present disclosure.
Figure 1:
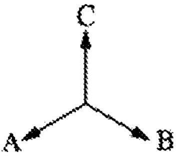

Reference will now be made in detail to the embodiments of the present disclosure, examples of which are illustrated in the accompanying drawings. The embodiments described in the specification and shown in the drawings are only illustrative and are not intended to represent all aspects of the invention, such that various modifications may be made without departing from the spirit of the invention.

In the drawings, like reference numerals denote like elements or components having substantially same functions.

The terms used throughout the specification are merely used to describe particular embodiments, and are not intended to limit the present disclosure. An expression used in the singular encompasses the expression of the plural unless it has a clearly different meaning in the context.

In the present specification, it is to be understood that the terms such as "including" or "having", etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another.

For example, a first component discussed below could be termed a second component without departing from the scope of the present disclosure, and similarly, the second component may be termed the first component without departing from the teachings of this disclosure. As used herein, the term "and/or" includes any and all combinations of one or more of the associated listed items.

The terms used throughout the specification "front", "rear", "upper", "lower", and the like are defined based on the drawings and the shape and position of each element are not limited by these terms.

Provided is a cooking appliance capable of cooking objects to be cooked at different optimal temperatures in the case where two or more different objects to be cooked are cooked simultaneously in the cooking appliance.

Provided is a cooking appliance capable of efficiently realizing a temperature difference between cooking areas partitioned in a shelf. According to an embodiment of the present disclosure, objects to be cooked may be cooked simultaneously at optimal temperatures therefor by effectively realizing temperature differences between cooking areas partitioned in the shelf using the heat-reflecting plate that focuses heat respectively emitted from the plurality of heaters which are individually controlled.

A plurality of objects to be cooked may be cooked simultaneously at optimal temperatures therefor by realizing different temperatures in cooking areas in accordance with the user's convenience by covering the object to be cooked and a part of the shelf with the cover member.

The cooking quality of the object to be cooked may be increased by realizing a precise temperature difference between the cooking areas of the shelf.

Hereinafter, embodiments of the present disclosure will be described in detail with reference to the accompanying drawings.

Figure 2:
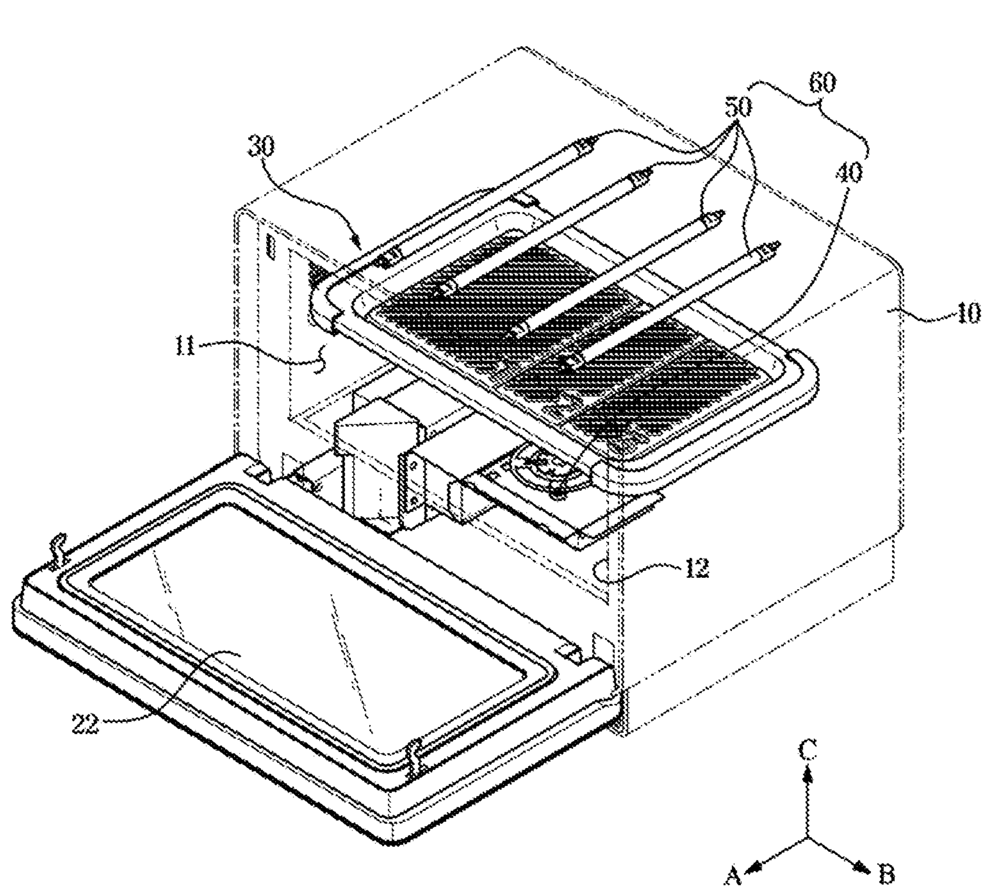
FIG. 2 is a diagram illustrating some components in a cooking appliance according to an embodiment of the present disclosure.
Figure 3:
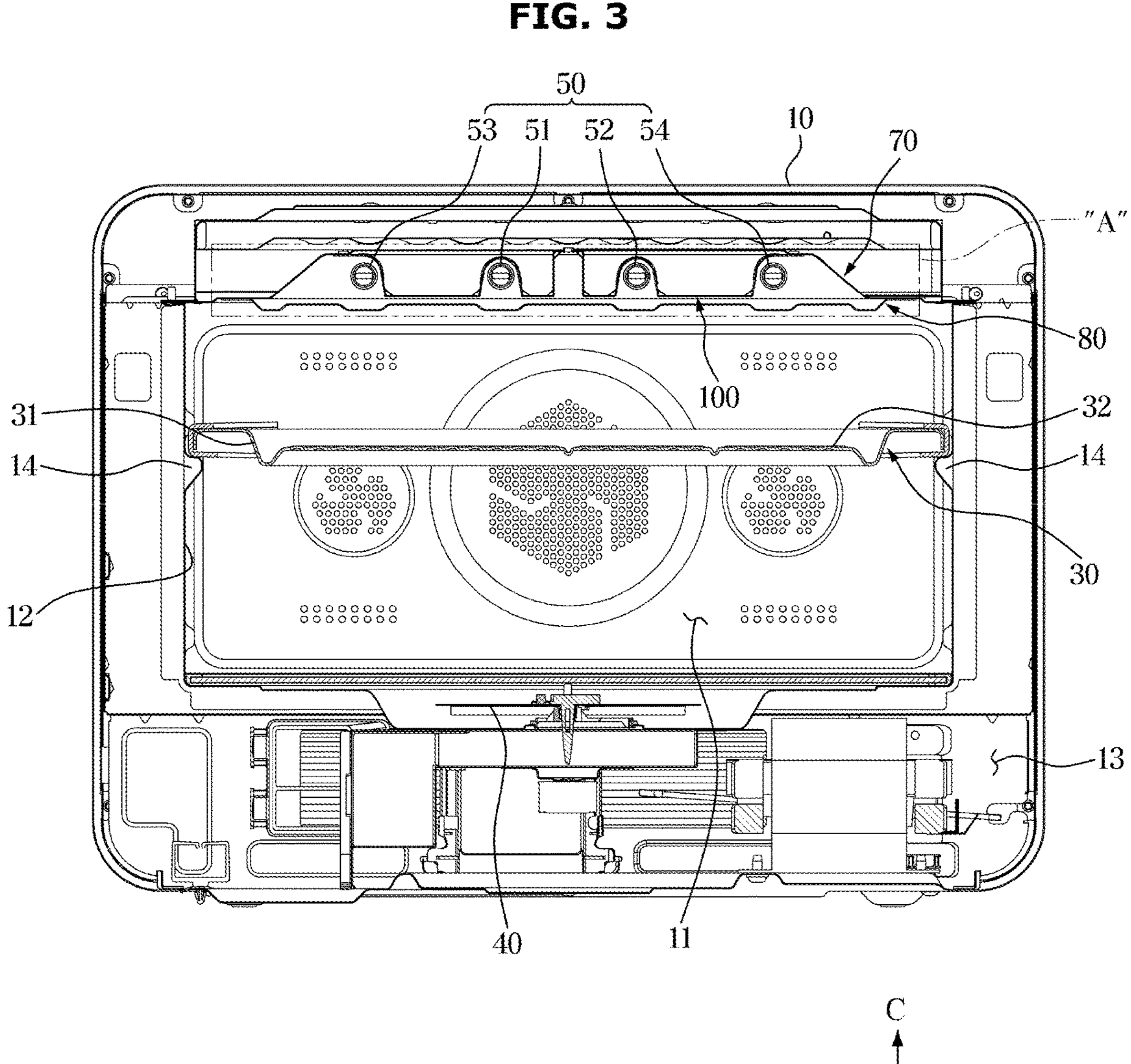
FIG. 3 is a cross-sectional view of a cooking appliance according to an embodiment of the present disclosure.

FIG. 1 is a perspective view of a cooking appliance according to an embodiment of the present disclosure. FIG. 2 is a diagram illustrating some components in a cooking appliance according to an embodiment of the present disclosure. FIG. 3 is a cross-sectional view of a cooking appliance according to an embodiment of the present disclosure.

Referring to FIGS. 1 to 3, a cooking appliance 1 may include a first housing 10 defining an exterior appearance, a second housing 12 disposed inside the first housing 10 and forming a cooking chamber 11, and the cooking chamber 11 formed inside the second housing 12 and containing an object to be cooked placed therein. The first housing 10 may be provided as an exterior housing, and the second housing 12 may be provided as an interior housing.

A certain space may be formed between the first housing 10 and the second housing 12.

The cooking chamber 11 may be formed in an approximately cuboid shape having a longer side in a first direction B. The first direction B may be provided in a lateral direction of the cooking chamber 11.

In addition, the first housing 10 and the second housing 12 may be provided to be open in a second direction A that is a front-to-back direction of the cooking appliance 1. The user may be located the object to be cooked in the cooking chamber 11 through an opening of the second housing 12 formed in the second direction A. The second direction A is a direction perpendicular to the first direction B, as a front-to-back direction of the cooking chamber 11.

The cooking appliance 1 may include a machine room 13 formed in the first housing 10 and disposed under the cooking chamber 11. Various electric components configured to drive the cooking appliance 1 may be disposed inside the machine room 13.

The cooking appliance 1 may include a door 20 provided to allow the opening of the first housing 10 and the second housing 12 to be open and closed.

The door 20 may include an inputter 21 allowing the user to input a signal to control the cooking appliance 1. The inputter 21 is not limited to that illustrated in FIG. 1 and may include a display (not shown) to display an image and a touch device (not shown) configured to input a signal by touching the image.

The door 20 may include a transparent member 22 allowing the user to observe the inside the cooking chamber 11 in a state where the door 20 is closed. The transparent member 22 may include a plastic or glass material, but is not limited thereto.

The cooking appliance 1 may include a shelf 30 mounted inside the cooking chamber 11 and provided to allow the user to place the object to be cooked thereon. The shelf 30 may be detachably disposed inside the cooking chamber 11.

The cooking chamber 11 may include supports 14 at both sides of the cooking chamber 11 to mount the shelf 30 between an upper surface and a lower surface of the cooking chamber 11.

A plurality of supports 14 may be provided in a third direction C perpendicular to the first direction B or the second direction A such that the shelf 30 is mounted at various heights. The third direction C may be a vertical direction of the cooking chamber 11.

The shelf 30 may include a main body 31 and a cooking surface 32 on which the object to be cooked is placed. The cooking surface 32 may be provided to face the upper surface of the cooking chamber 11 in a state where the shelf 30 is mounted.

The cooking appliance 1 may include a heat source 60 configured to supply heat into the cooking chamber 11 so as to cook the object to be cooked using the heat.

The heat source 60 may be provided to cook the object to be cooked by supplying heat to the object to be cooked placed on the shelf 30. In addition, the object to be cooked may be located on the lower surface of the cooking chamber 11 without the shelf 30, and the heat source 60 may also supply heat to the object to be cooked located on the lower surface in this case.

The heat source 60 may include a first heat source 50 disposed at an upper portion of the cooking chamber 11.

The heat source 60 may include a second heat source 40 disposed at a lower portion of the cooking chamber 11.

The first heat source 50 may include a plurality of heaters 51, 52, 53, and 54 configured to generate radiant heat. The plurality of heaters 51, 52, 53, and 54 may radiate heat generated therein to directly transfer the heat to the object to be cooked.

The second heat source 40 may include a magnetron configured to generate high frequency radio waves. The high frequency radio waves generated by the magnetron is radiated into the object to be cooked such that the inside of the object to be cooked is cooked using fractional heat among molecules generated by repeatedly altering molecular arrangement of moisture contained in the object to be cooked.

The second heat source 40 may be disposed in the machine room 13. The second heat source 40 oscillates high frequency radio waves to the lower surface of the cooking chamber 11 from the machine room 13 and the high frequency radio waves may pass through the lower surface to be radiated to the shelf 30.

A conventional microwave-type cooking appliance is provided to cook the object to be cooked using a magnetron. In this case, a problem that high frequency radio waves are not evenly transmitted to all parts of the object to be cooked may occur according to distribution or content of moisture of the object to be cooked, thereby failing to efficiently cook the object to be cooked.

Accordingly, the problem has been solved by further mounting the heaters capable of transmitting heat to all parts of the object to be cooked. Particularly, in the case where the object to be cooked requires a higher external temperature for cooking, the cooking operation may be efficiently performed by using heat of the additional heaters.

The cooking appliance 1 according to an embodiment of the present disclosure may be provided to efficiently perform a cooking process of the object to be cooked by including the first heat source 50 and the second heat source 40.

The shelf 30 may include a plurality of cooking areas 34, 35, and 36, and the plurality of heaters 51, 52, 53, and 54 may be mounted at an upper portion of the cooking chamber 11 to be spaced apart from each other to correspond to the plurality of cooking areas 34, 35, and 36. Specifically, the plurality of heaters 51, 52, 53, and 54 may be spaced along the first direction B. Accordingly, the shelf 30 may also include the plurality of cooking areas 34, 35, and 36 partitioned along the first direction B.

The plurality of heaters 51, 52, 53, and 54 may extend in the second direction A, respectively. Each of the plurality of heaters 51, 52, 53, and 54 may be provided in an approximately long cylindrical shape.

A heat-reflecting plate 100 provided to individually accommodate the plurality of heaters 51, 52, 53, and 54 may be provided on the plurality of heaters 51, 52, 53, and 54. In addition, a heater cover 80 may be provided under the plurality of heaters 51, 52, 53, and 54 between the plurality of heaters 51, 52, 53, and 54 and the cooking chamber 11.

The plurality of heaters 51, 52, 53, and 54 may be individually controlled. Accordingly, temperatures respectively corresponding to heat of the heaters may be provided to positions respectively corresponding to the heaters in the third direction C in the cooking chamber 11.

Specifically, partitioned areas having different temperatures may be provided on the cooking surface 32 of the shelf 30.

The plurality of cooking areas 34, 35, and 36 may be formed on the cooking surface 32 of the shelf 30 at different positions respectively corresponding to the heaters in the third direction C. Heat differently generated by each of the heaters may be directly transferred to each area.

Accordingly, by arranging a plurality of objects to be cooked at the different areas in the cooking chamber 11 at the same time, each of the objects to be cooked may be cooked at an optimal temperature therefor. That is, in the case where the plurality of objects to be cooked are located in different areas of the shelf 30, the objects to be cooked may be cooked simultaneously at different temperatures. This will be described in more detail below.

Figure 4:
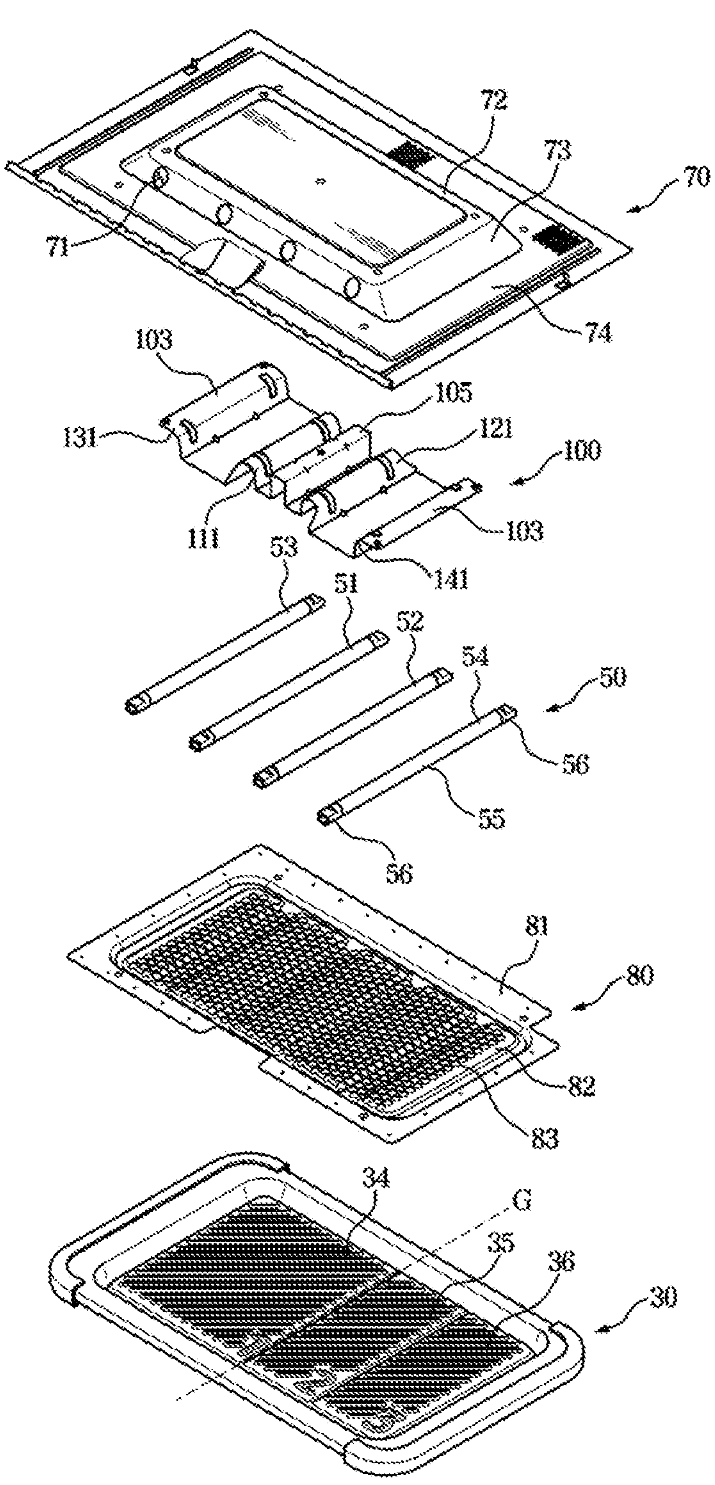
FIG. 4 is an exploded view illustrating main components of a cooking appliance according to an embodiment of the present disclosure.
Figure 5:
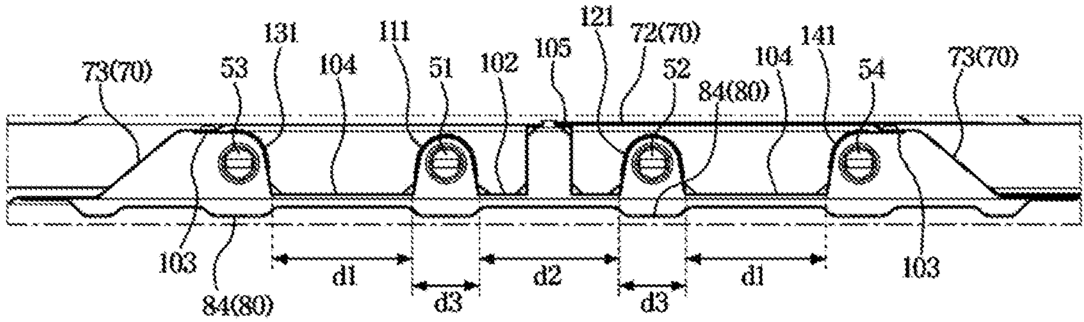
FIG. 5 is an enlarged view of part A of FIG. 3.

FIG. 4 is an exploded view illustrating main components of a cooking appliance according to an embodiment of the present disclosure. FIG. 5 is an enlarged view of part A of FIG. 3.

Referring to FIGS. 4 and 5, the cooking appliance 1 may include a plurality of heaters 51, 52, 53, and 54 respectively supplying heat to the partitioned plurality of cooking areas

34, 35, and 36 of the shelf 30. In addition, the cooking appliance 1 may include a heat-reflecting plate 100 to focus heat emitted from the plurality of heaters 51, 52, 53, and 54 into the plurality of cooking areas.

The plurality of heaters 51, 52, 53, and 54 may include a first heater 51, a second heater 52, a third heater 53, and a fourth heater 54. Although 4 heaters are described as an example of the plurality of heaters 51, 52, 53, and 54 in the embodiment, the number of the plurality of heaters 51, 52, 53, and 54 is not limited thereto and more heaters may be included.

Because the plurality of heaters 51, 52, 53, and 54 have the same shape, descriptions of the plurality of heaters 51, 52, 53, and 54 will be given based on the fourth heater 54.

Each of the plurality of heaters 51, 52, 53, and 54 may include a body 55 extending in the second direction A and generating heat by a power source and opposite end edges 56 disposed at opposite ends of the body 55.

The opposite end edges 56 may be provided to allow an external power to be supplied to the heater. The body 55 may generate heat by the external power supplied from the opposite end edges 56. Accordingly, heat may be radiated from the plurality of heaters 51, 52, 53, and 54.

The first heater 51 may be located at one side in the first direction B, and the second heater 52 may be located at the opposite side of the first heater 51 in the first direction B.

Specifically, the first heater 51 may be located at one side and the second heater 52 may be located on the opposite side relative to the central line G of the cooking surface 32 in the first direction B. The third heater 53 may be located adjacent to the first heater 51, and the fourth heater 54 may be located adjacent to the second heater 52.

A total amount of heat generated by each of the first heater 51, the second heater 52, the third heater 53, and the fourth heater 54 may be different.

A temperature of heat generated by the plurality of heaters 51, 52, 53, and 54 may be the same. However, the plurality of heaters 51, 52, 53, and 54 may be controlled such that the total amount of heat generated by each of the plurality of heaters 51, 52, 53, and 54 is different while the cooking appliance 1 is driven by repeatedly turning on/off the plurality of heaters 51, 52, 53, and 54.

The shelf 30 may include a first cooking area 34, a second cooking area 35, and a third cooking area 36 formed on the cooking surface 32. The first cooking area 34, the second cooking area 35, and the third cooking area 36 may be partitioned along the first direction B.

Specifically, relative to the central line G, the first cooking area 34 may be formed at one side, and the second cooking area 35 and the third cooking area 36 may be formed at the other side.

The first cooking area 34 may be located at a position corresponding to the first and third heaters 51 and 53 in the third direction C. The second cooking area 35 may be located at a position corresponding to the second heater 52 in the third direction C. The third cooking area 36 may be located at a position corresponding to the fourth heater 54 in the third direction C.

The heat-reflecting plate 100 is provided above the plurality of heaters 51, 52, 53, and 54 such that the plurality of cooking areas of the shelf 30 have different temperatures by the plurality of heaters 51, 52, 53, and 54.

The heat-reflecting plate 100 may include a plurality of reflectors 111, 121, 131, and 141 and a plurality of connectors extending in the first direction B to connect the plurality of reflectors 111, 121, 131, and 141.

The plurality of reflectors 111, 121, 131, and 141 may individually accommodate the plurality of heaters 51, 52, 53, and 54. Accordingly, the plurality of reflectors 111, 121, 131, and 141 may also be formed to be spaced apart from each other along the first direction B.

The plurality of reflectors 111, 121, 131, and 141 may be formed in a bent shape and have a curved surface with one open side, respectively. More specifically, the plurality of reflectors 111, 121, 131, and 141 may be open to the cooking chamber 11.

The plurality of reflectors 111, 121, 131, and 141 may include a first reflector 111 and a second reflector 121 symmetrically formed as reflectors adjacent to the central region of the heat-reflecting plate 100. The first reflector 111 and the second reflector 121 may have an approximately inverted U-shape. More specifically, the first reflector 111 and the second reflector 121 may be symmetrically formed with respect to the central line G of the cooking surface 32 of the shelf 30.

The plurality of reflectors 111, 121, 131, and 141 may include a third reflector 131 and a fourth reflector 141 symmetrically formed as reflectors formed at ends of the heat-reflecting plate 100. The third reflector 131 and the fourth reflector 141 have an approximately inverted U-shape cut in half. More specifically, the third reflector 131 and the fourth reflector 141 may be symmetrically formed with respect to the central line G of the cooking surface 32 of the shelf 30.

The heat-reflecting plate 100 may include a plurality of couplers 103 provided at opposite ends and extending outward respectively from the third reflector 131 and the fourth reflector 141. The plurality of couplers 103 may be provided at opposite ends of the heat-reflecting plate 100 to be coupled to a heater housing 70 which will be described below. The plurality of couplers 103 may be coupled to the heater housing 70 by welding. However, a coupling method of the couplers 103 is not limited thereto.

The heat-reflecting plate 100 may include a plurality of connectors 102 and 104 provided between the plurality of reflectors 111, 121, 131, and 141. The plurality of connectors 102 and 104 may include a first connector 102 and a second connector 104.

The first connector 102 may extend in the first direction B between the first reflector 111 and the second reflector 121 among the plurality of reflectors 111, 121, 131, and 141. The first connector 102 may include a coupler 105. The coupler 105 may be formed in a plate shape bent from the first connector 102 upward along the third direction C. The coupler 105 may be provided at the center of the heat-reflecting plate 100 to be coupled to a heater housing 70 which will be described below. The coupler 105 may be coupled to the heater housing 70 by welding. However, a coupling method of the coupler 105 is not limited thereto. By further forming the coupler 105 at the center in addition to the plurality of couplers 103 formed at the ends of the heat-reflecting plate 100, coupling stability of the heat-reflecting plate 100 may be improved.

The second connectors 104 may extend in the first direction B between the first reflector 111 and the third reflector 131 and extend in the first direction B between the second reflector 121 and the fourth reflector 141.

The cooking appliance 1 may include a heater housing 70 and a heater cover 80.

The heater housing 70 may be provided at one portion of the cooking chamber 11 and accommodate the plurality of heaters 51, 52, 53, and 54 and the heat-reflecting plate 100.

The heat-reflecting plate 100 may be disposed between the plurality of heaters 51, 52, 53, and 54 and the heater housing 70.

Specifically, the heater housing 70 may include a first surface 72, a second surface 73, and a third surface 74.

The first surface 72 is formed at a different height from that of the third surface 74, and the second surface 73 is provided to connect the first surface 72 with the third surface 74. The second surface 73 may be formed as an inclined surface. However, the shape is not limited thereto.

The first surface 72 and the second surface 73 may constitute an accommodation space (not shown) to accommodate the plurality of heaters 51, 52, 53, and 54 and the heat-reflecting plate 100. The plurality of heaters 51, 52, 53, and 54 may be provided to penetrate the heater housing 70.

The second surface 73 of the heater housing 70 may have a plurality of heater through-holes 71 through which the plurality of heaters 51, 52, 53, and 54 pass. The opposite end edges 56 of the plurality of heaters 51, 52, 53, and 54 pass through the heater through-holes 71 outward from the heater housing 70 to receive an electric power.

The heater cover 80, which will be described below, may be coupled to the third surface 74 of the heater housing 70. Therefore, the plurality of heaters 51, 52, 53, and 54 and the heat-reflecting plate 100 may be accommodated and arranged in a space formed between the heater housing 70 and the heater cover 80.

The heater cover 80 may be provided between the plurality of heaters 51, 52, 53, and 54 and the cooking chamber 11. The heater cover 80 may have a flange 81 formed at edges. The flange 81 may be coupled to the third surface 74 of the heater housing 70.

The heater cover 80 may have a bottom surface 82 formed to be closer to the cooking chamber 11 than the flange 81. The bottom surface 82 of the heater cover 80 may have a plurality of holes 83. The plurality of holes 83 may be provided as burring holes 83. Heat emitted from the plurality of heaters 51, 52, 53, and 54 through the plurality of holes 83 may be supplied to the cooking surface 32 of the shelf 30 after passing through the cooking chamber 11. By densely forming the plurality of holes 83, heat emitted from the plurality of heaters 51, 52, 53, and 54 may have straightness toward each of the cooking areas.

The bottom surface 82 of the heater cover 80 may include a bent region 84 that is bent toward the cooking chamber 11. Because a portion of the heater cover 80 disposed close to the plurality of heaters 51, 52, 53, and 54 may be deformed by heat generated by the heaters, deformation of the heat cover 80 may be prevented by forming the bent region 84 to be close to the heaters in advance.

Components disposed adjacent to the plurality of heaters 51, 52, 53, and 54 may be vulnerable to contamination by food being cooked or discoloration by high temperature. To prevent the contamination and discoloration, the heater cover 80 may include an aluminum material. In addition, the heat-reflecting plate 100 may also include an aluminum material to increase the lifespan.

Referring to FIG. 5, the relation between the heat-reflecting plate 100 and the plurality of heaters 51, 52, 53, and 54 will be described in detail.

The plurality of reflectors 111, 121, 131, and 141 may be provided to reflect heat emitted from the plurality of heaters 51, 52, 53, and 54. Specifically, the plurality of reflectors 111, 121, 131, and 141 may be provided to reflect heat randomly emitted from the plurality of heaters 51, 52, 53, and 54 toward the plurality of cooking areas 34, 35, and 36 formed below the plurality of heaters 51, 52, 53, and 54.

Heat reflected by the plurality of reflectors 111, 121, 131, and 141 may be supplied to the plurality of cooking areas 34, 35, and 36 via open areas of the plurality of reflectors 111, 121, 131, and 141.

That is, heat emitted from each of the plurality of heaters 51, 52, 53, and 54 may spread out in an approximately radial direction with respect to a cross-section of each heater in the first direction B. However, the object to be cooked is located in the cooking areas 34, 35, and 36 of the shelf 30, and thus heat randomly emitted from the heaters needs to be focused onto one position.

Therefore, the plurality of reflectors 111, 121, 131, and 141 may be provided to intensively supply heat to the cooking areas 34, 35, and 36 respectively corresponding to the plurality of heaters 51, 52, 53, and 54 by reflecting heat emitted from the plurality of heaters 51, 52, 53, and 54. For example, the plurality of reflectors 111, 121, 131, and 141 may be formed to be similar in shape to an antenna and reflect heat emitted from the plurality of heaters 51, 52, 53, and 54 such that heat supplied to each of the cooking areas 34, 35, and 36 from each of the plurality of heaters 51, 52, 53, and 54 has an orientation.

However, in a structure where the plurality of heaters 51, 52, 53, and 54 are disposed too close to each other, heat generated by the adjacent heaters may interfere with each other.

Thus, to effectively realize the temperature difference between the plurality of cooking areas 34, 35, and 36, lengths d1 and d2 of the plurality of connectors 102 and 104 in the first direction B may be formed to be greater than a length d3 of the plurality of reflectors 111, 121, 131, and 141 open along the first direction B. In other words, distances d1 and d2 between the plurality of reflectors 111, 121, 131, and 141 in the first direction B may be formed to be greater than the length d3 of the plurality of reflectors 111, 121, 131, and 141 in the first direction B.

Specifically, the length d3 of the first reflector 111 and the second reflector 121 in the first direction B may correspond to a region to which heat emitted from the first heater 51 and the second heater 52 is intensively supplied. Therefore, effects of heat by two adjacent heaters may be minimized by increasing the distance between the first reflector 111 and the second reflector 121 to be greater than the length d3.

In addition, a distance between the first reflector 111 and the third reflector 131 and a distance between the second reflector 121 and the fourth reflector 141 may be formed greater than the open length d3 of the plurality of reflectors 111, 121, 131, and 141 in the first direction B. This may efficiently lead to the temperature difference between cooking areas corresponding to the heaters, respectively.

In conclusion, effects of the adjacent heaters may be minimized among the plurality of heaters 51, 52, 53, and 54 independently controlled and generating different heat.

Therefore, the temperatures of heat supplied to the first cooking area 34, the second cooking area 35, and the third cooking area 36 of the shelf 30 may be different from each other. Specifically, heat may be supplied to the first cooking area 34 from the first heater 51 and the third heater 53, heat may be supplied to the second cooking area 35 from the second heater 52, and heat may be intensively supplied to the third cooking area 36 from the fourth heater 54.

That is, by the configuration of the heat-reflecting plate 100, the temperature difference between the cooking areas may be efficiently realized and a precisely partitioned multi-zone may be obtained without mounting a separate structure.

Although the first cooking area 34 is formed wider than the second cooking area 35 and the third cooking area 36 in the present embodiment, the present disclosure is not limited thereto, and the number of the cooking areas of the shelf 30 may correspond to the number of the plurality of heaters 51, 52, 53, and 54, and thus the first cooking area 34 may also be partitioned as the second cooking area 35 and the third cooking area 36. That is, the shelf 30 may be partitioned into 4 areas. Also, the shelf 30 may be partitioned into more areas in accordance with the number of the plurality of heaters 51, 52, 53, and 54.

Although it has been described that heat generated by a single heater is the same as heat of another single heater in the embodiment, internal resistance of a heating wire may be set different along an extending direction of the heating wire so that regions of a single heater may generate different heat. Accordingly, the shelf 30 may be partitioned along the first direction B to receive different heat, and further partitioned along the second direction A to receive different heat, and thus the shelf 30 may be partitioned into more cooking areas.

Also, as well as the method of varying the internal resistance of the heating wire, a method of varying radiant heat supplied to the shelf 30 from the heaters by attaching a reflective film to a predetermined region in the heater may also be used.

Figure 6:
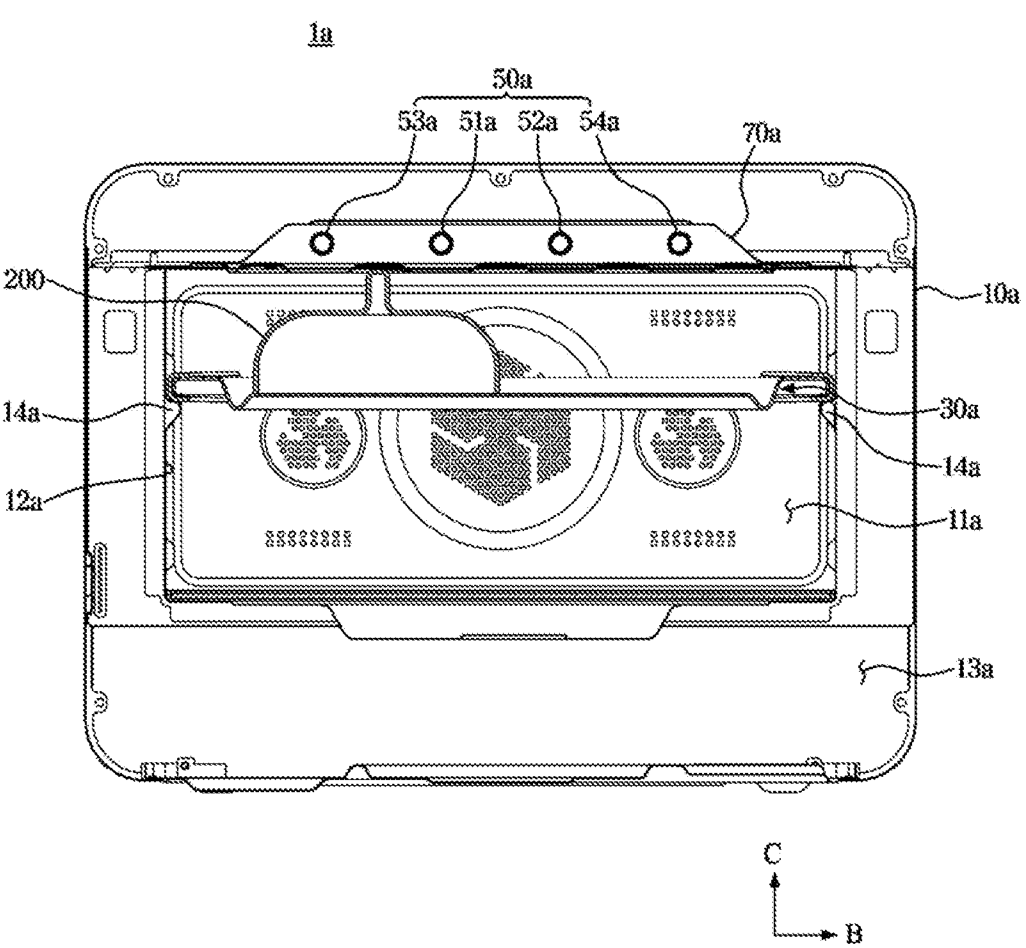
FIG. 6 is a cross-sectional view of a cooking appliance according to another embodiment of the present disclosure.
Figure 7:
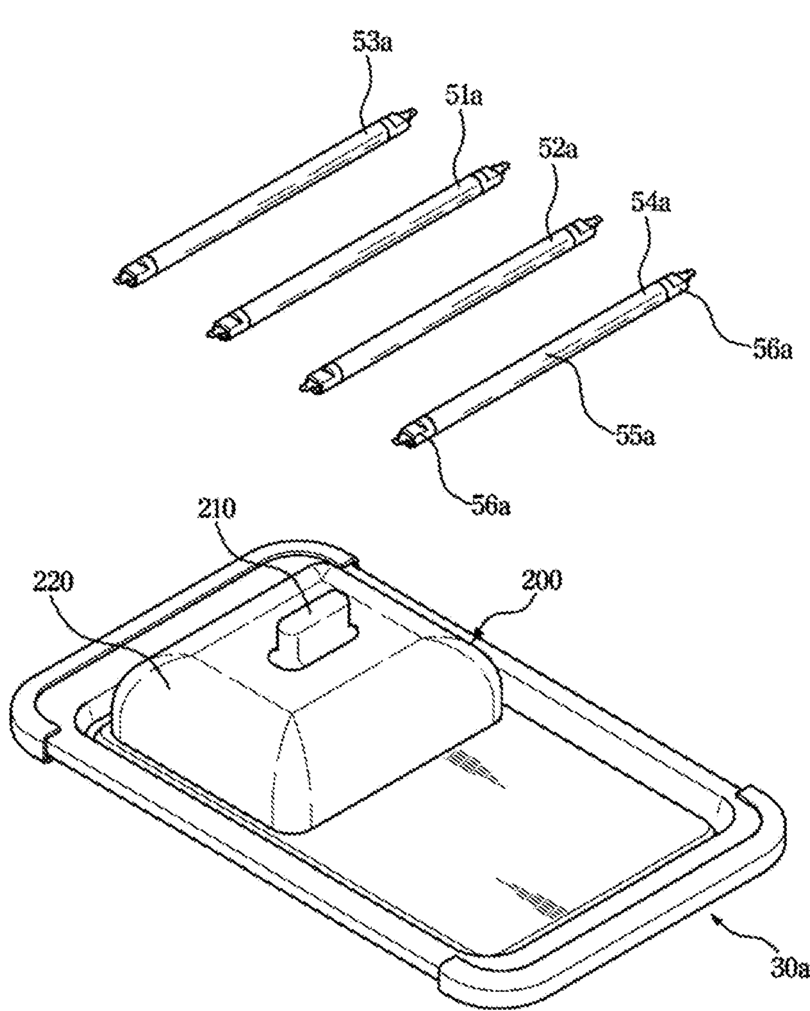
FIG. 7 is a diagram illustrating main components of the cooking appliance and a cover member of the embodiment.

FIG. 6 is a cross-sectional view of a cooking appliance according to another embodiment of the present disclosure. FIG. 7 is a diagram illustrating main components of the cooking appliance and a cover member of the embodiment.

Hereinafter, the embodiment will be described based on difference from those of the previous embodiment of the present disclosure. Components not illustrated in FIGS. 6 and 7 or not described therewith may be the same as those of the previous embodiment of the present disclosure and may have the same reference numerals.

Referring to FIGS. 6 and 7, a cooking appliance **1*a* may include a first housing 10*a* defining an exterior appearance, a second housing 12*a* disposed inside the first housing 10*a* and forming a cooking chamber 11*a*, and the cooking chamber 11*a* formed inside the second housing 12*a* and containing an object to be cooked placed therein. The first housing 10*a* may be provided as an exterior housing, and the second housing 12*a*** may be provided as an interior housing.

The cooking chamber **11*a* may be formed in an approximately cuboid shape having a longer side in the first direction B. The first direction B may be provided in a lateral direction of the cooking chamber 11**.

The cooking appliance **1*a* may include a machine room 13*a* formed in the first housing 10*a* and disposed under the cooking chamber 11*a*. Various electric components configured to drive the cooking appliance 1*a* may be disposed inside the machine room 13*a***.

The cooking appliance **1*a* may include a shelf 30*a* mounted inside the cooking chamber 11*a* and provided to allow the user to place the object to be cooked thereon. The shelf 30*a*** may be detachably disposed inside the cooking chamber Ila.

The cooking chamber **11*a* may include supports 14*a* formed at both sides of the cooking chamber 11*a* to mount the shelf 30*a* between an upper surface and a lower surface of the cooking chamber 11*a***.

A plurality of supports **14*a* may be provided in the third direction C perpendicular to the first direction B or the second direction A such that the shelf 30*a* is mounted at various heights. The third direction C may be a vertical direction of the cooking chamber 11**.

The shelf **30*a* may include a main body and a cooking surface on which the object to be cooked is placed. The cooking surface may be provided to face the upper surface of the cooking chamber 11*a* in the case where the shelf 30*a*** is mounted.

The cooking appliance **1*a* may include a heat source configured to supply heat into the cooking chamber 11*a*** so as to cook the object to be cooked using the heat.

The heat source may be provided to cook the object to be cooked by supplying heat to the object to be cooked placed on the shelf **30*a*. In addition, the object to be cooked may be located on the lower surface of the cooking chamber 11*a* without the shelf 30*a***, and the heat source may also supply heat to the object to be cooked located on the lower surface in this case.

The heat source **50*a* may include a plurality of heaters 51*a*, 52*a*, 53*a*, and 54*a* disposed at an upper portion of the cooking chamber 11*a*. The plurality of heaters 51*a*, 52*a*, 53*a*, and 54*a*** may radiate heat generated therein to directly transfer the heat to the object to be cooked.

Each of the plurality of heaters **51*a*, 52*a*, 53*a*, and 54*a* may include a body 55*a* extending in the second direction A and generating heat by a power source and opposite end edges 56*a* disposed at opposite ends of the body 55*a***.

The opposite end edges **56*a* may be provided to allow an external power to be supplied to the heater. The body 55*a* may generate heat by the external power supplied from the opposite end edges 56*a*. Accordingly, heat may be radiated from the plurality of heaters 51*a*, 52*a*, 53*a*, and 54*a***.

The plurality of heaters **51*a*, 52*a*, 53*a*, and 54*a* may be spaced apart along the first direction B. Each of the plurality of heaters 51*a*, 52*a*, 53*a*, and 54*a* may extend in the second direction A. The plurality of heaters 51*a*, 52*a*, 53*a*, and 54*a*** may be provided in an approximately long cylindrical shape.

A heater housing **70*a* provided to accommodate the plurality of heaters 51*a*, 52*a*, 53*a*, and 54*a* may be disposed on the plurality of heaters 51*a*, 52*a*, 53*a*, and 54*a***.

Unlike the previous embodiment of the present disclosure, the cooking appliance **1*a* according to the present embodiment may include a cover member 200**.

The cover member 200 may be provided to cover the object to be cooked placed on the shelf **30*a*. The cover member 200** may be formed in an approximately rectangular shape.

The cover member 200 may include a cover 220 and a handle 210 provided in the center at the top. The user may move the cover member 200 by grabbing the handle 210 of the cover member 200.

The cover member 200 may be provided to partially transmit heat supplied to the cooking area of the shelf **30*a* from the plurality of heaters 51*a*, 52*a*, 53*a*, and 54*a***.

That is, because the cover member 200 has a relatively low thermal transmittance, an object to be cooked covered with the cover member 200 is cooked at a lower temperature than that of an object to be cooked not covered with the cover member 200.

Figure 8:
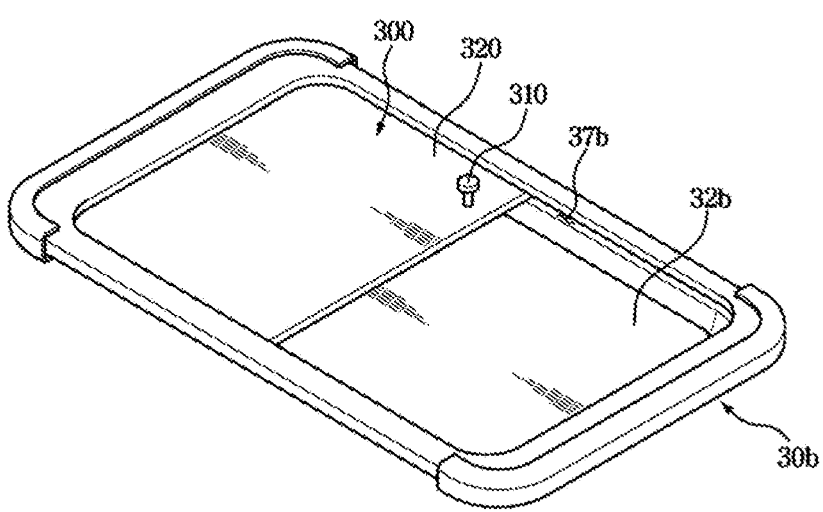
FIG. 8 is a diagram illustrating modified examples of a cover member and a shelf of a cooking appliance according to another embodiment of the present disclosure.

FIG. 8 is a diagram illustrating modified examples of a cover member and a shelf of a cooking appliance according to another embodiment of the present disclosure.

Referring to FIG. 8, a cover member 300 may be provided to slidably move with respect to a shelf **30*b*. The shelf 30*b* includes a cooking surface 32*b* and a groove 37*b* formed at edges such that a part of the cover member 300** is inserted thereinto and move.

The cover member 300 may include a handle 310 and a cover 320. A user may slidably move the cover member 300 by grabbing the handle 310 of the cover member 300.

By the configuration of the cover members 200 and 300 shown in FIGS. 6 to 8, the cooking area of the shelf may be partitioned in accordance with the user convenience, thereby providing a user with an increased convenience in use. Using the configuration, objects to be cooked may be cooked in different temperatures in the cooking appliance 1*b*.

Figure 9:
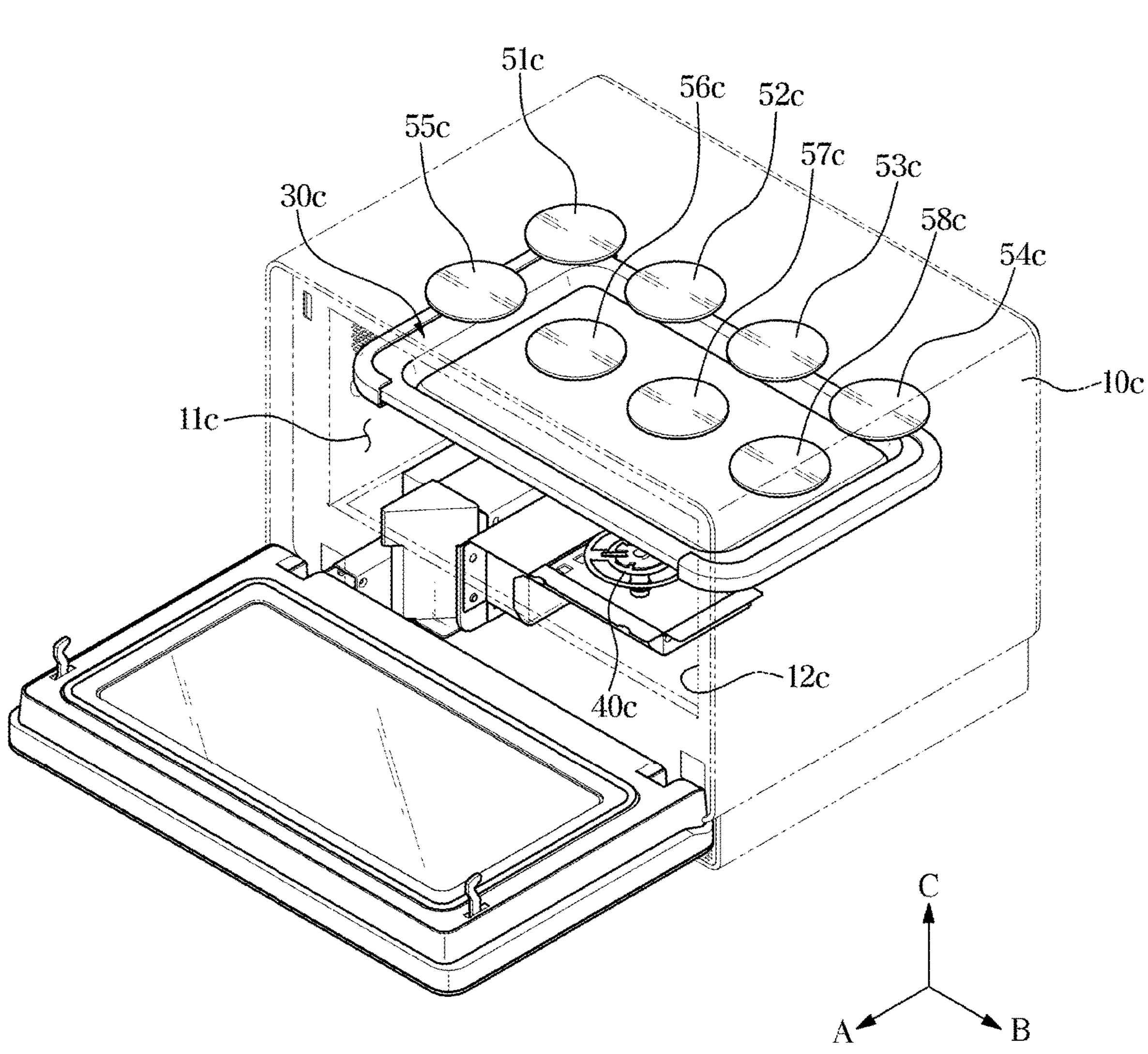
FIG. 9 is a diagram illustrating some components in a cooking appliance according to another embodiment of the present disclosure.

FIG. 9 is a diagram illustrating some components in a cooking appliance according to another embodiment of the present disclosure.

Referring to FIG. 9, the embodiment will be described based on difference from those of the previous embodiment of the present disclosure.

A cooking appliance 1*c* may include a first housing 10*c* defining an exterior appearance, a second housing 12*c* disposed inside the first housing 10*c* and forming a cooking chamber 11*c*, and the cooking chamber 11*c* formed inside the second housing 12*c* and containing an object to be cooked placed therein. The first housing 10*c* may be provided as an exterior housing, and the second housing 12*c* may be provided as an interior housing.

The cooking chamber 11*c* may be formed in an approximately cuboid shape having a longer side in the first direction B. The first direction B may be provided in a lateral direction of the cooking chamber 11*c*.

The cooking appliance 1*c* may include a shelf 30*c* mounted inside the cooking chamber 11*c* and provided to allow the user to place an object to be cooked thereon. The shelf 30*c* may be detachably disposed inside the cooking chamber 11*c*.

The shelf 30*c* may include a main body and a cooking surface on which the object to be cooked is placed. The cooking surface may be provided to face the upper surface of the cooking chamber 11*c* in a state where the shelf 30*c* is mounted.

The cooking appliance 1*c* may include a heat source configured to supply heat into the cooking chamber 11*c* so as to cook the object to be cooked using the heat.

The heat source may be provided to cook the object to be cooked by supplying heat to the object to be cooked placed on the shelf 30*c*.

The heat source may include a plurality of heaters 51*c*, 52*c*, 53*c*, 54*c*, 55*c*, 56*c*, 57*c*, and 58*c* mounted at an upper portion of the cooking chamber 11*c*. The plurality of heaters 51*c*, 52*c*, 53*c*, 54*c*, 55*c*, 56*c*, 57*c*, and 58*c* may radiate heat generated therein to directly transfer the heat to the object to be cooked.

The heat source may further include a heat source 40*c* disposed at a lower portion of the cooking chamber 11. The heat source 40*c* is similar to the heat source 40, therefore, the description of the heat source 40*c* is omitted.

Unlike the heaters according to the previous embodiment, the plurality of heaters 51*c*, 52*c*, 53*c*, 54*c*, 55*c*, 56*c*, 57*c*, and 58*c* according to another embodiment of the present disclosure may be provided as circular heaters. Although the present embodiment discloses 8 circular heaters in total, the number of the heaters is not limited thereto.

By providing the plurality of heaters 51*c*, 52*c*, 53*c*, 54*c*, 55*c*, 56*c*, 57*c*, and 58*c* in the circular shape, the cooking areas of the shelf 30*c* corresponding thereto may be partitioned in an approximately checkerboard shape. Therefore, several objects to be cooked having relatively small volumes may be cooked simultaneously.

The embodiments of the present disclosure have been shown and described above with reference to the accompanying drawings. However, the disclosed embodiments are illustrative and the scope of the present disclosure is not limited thereby. It will be understood by those of ordinary skill in the art that the present disclosure may be easily modified into other detailed forms without changing the technical principle or essential features of the present disclosure.

What is claimed is:

1. A cooking appliance comprising:
a cooking chamber;
a shelf disposed in the cooking chamber, the shelf comprising a plurality of cooking areas;
a plurality of heaters mounted in the cooking chamber, the plurality of heaters being spaced apart from one another to respectively correspond to the plurality of cooking areas, and being independently controllable to generate heat; and
a heat-reflecting plate comprising a plurality of reflectors respectively accommodating the corresponding plurality of heaters, the heat-reflecting plate configured to reflect the heat generated by the plurality of heaters toward the corresponding plurality of cooking areas to generate a temperature difference among the plurality of cooking areas,
wherein each of the plurality of reflectors partially surrounds a corresponding heater of the plurality of heaters, and accommodates the corresponding heater while being spaced apart from the corresponding heater, and
wherein at least one of the plurality of reflectors is opened toward a side portion of the cooking chamber.

2. The cooking appliance according to claim 1, wherein each of the plurality of reflectors is formed by bending the heat-reflecting plate, and has a curved surface to partially surrounds the corresponding heater to form an open portion to accommodate the corresponding heater therein, and
wherein the at least one of the plurality of reflectors opened toward the side portion of the cooking chamber is an end reflector of the plurality of reflectors.

3. The cooking appliance according to claim 2, wherein the heat-reflecting plate further comprises a plurality of connectors extending in a first direction to connect the plurality of reflectors adjacent to each other, and a length of each of the plurality of connectors is greater than a length of the open portion of each of the plurality of reflectors in the first direction.

4. The cooking appliance according to claim 2, wherein a direction where the plurality of heaters is spaced apart is a first direction, the plurality of heaters extends in a second direction perpendicular to the first direction, and the plurality of reflectors respectively reflects the heat generated by the plurality of heaters to the plurality of cooking areas through the open portion.

5. The cooking appliance according to claim 1, wherein the plurality of reflectors comprises:
a first reflector and a second reflector symmetrically formed to be adjacent to a central region of the heat-reflecting plate; and
a third reflector and a fourth reflector symmetrically formed at end regions of the heat-reflecting plate, and
wherein the at least one of the plurality of reflectors opened toward the side portion of the cooking chamber is at least one of the third reflector and the fourth reflector formed at the end regions of the heat-reflecting plate.

6. The cooking appliance according to claim 5, wherein the heat-reflecting plate further comprises a plurality of couplers respectively extending outward from the third reflector and the fourth reflector and formed at opposite ends of the heat-reflecting plate.

7. The cooking appliance according to claim 1, further comprising a heater housing disposed at one portion of the cooking chamber to accommodate to the plurality of heaters and the heat-reflecting plate, wherein the heat-reflecting plate is disposed between the plurality of heaters and the heater housing.

8. The cooking appliance according to claim 7, wherein the plurality of heaters penetrates the heater housing.

9. The cooking appliance according to claim 7, wherein the heat-reflecting plate further comprises a planar coupler coupled to the heater housing at a central region of the heat-reflecting plate.

10. The cooking appliance according to claim 1, further comprising a heater cover disposed between the plurality of heaters and the cooking chamber and, the heater cover has a plurality of holes through which the heat generated by the plurality of heaters passes and the heat reflected by the plurality of reflectors passes.

11. The cooking appliance according to claim 10, wherein the heater cover comprises an aluminum material.

12. The cooking appliance according to claim 1, wherein each of the plurality of heaters has different internal resistances along an extending direction.

13. The cooking appliance according to claim 1, wherein at least one of the plurality of reflectors is bent in a U-shape around the plurality of heaters.

14. The cooking appliance according to claim 1, wherein the plurality of cooking areas is partitioned along a first direction, and the plurality of reflectors is spaced apart along the first direction to correspond to the plurality of cooking areas, respectively.

15. The cooking appliance according to claim 14, wherein a distance between the plurality of reflectors in the first direction is greater than a length of each of the plurality of reflectors in the first direction.

16. A cooking appliance comprising:

a cooking chamber;

a shelf disposed in the cooking chamber and withdrawable therefrom, the shelf having a plurality of cooking areas;

a plurality of heaters spaced apart along a first direction; and a heat-reflecting plate comprising a plurality of reflectors having an open curved surface to respectively accommodate the corresponding plurality of heaters therein, wherein at least one of the plurality of reflectors has an open curved surface open toward a side portion of the cooking chamber, and wherein the plurality of heaters are independently controlled and heat reflected by the plurality of reflectors is supplied to the corresponding plurality of cooking areas.

17. The cooking appliance according to claim 16, wherein the heat-reflecting plate further comprises a plurality of connectors extending in the first direction to connect the plurality of reflectors adjacent to one another, and a length of each of the plurality of connectors is greater than a length of the open curved surface of each of the plurality of reflectors in the first direction.

18. The cooking appliance according to claim 16, wherein the plurality of reflectors comprises;

a first reflector and a second reflector symmetrically formed to be adjacent to a central region of the heat-reflecting plate; and a third reflector and a fourth reflector symmetrically formed at end regions of the heat-reflecting plate, wherein the at least one of the plurality of reflectors opened toward the side portion of the cooking chamber is at least one of the third reflector and the fourth reflector formed at the end regions of the heat-reflecting plate.

* * * * *